US011876467B1

(12) United States Patent
Zhuge et al.

(10) Patent No.: US 11,876,467 B1
(45) Date of Patent: Jan. 16, 2024

(54) MOTOR INVERTER BASED CONVERTER FOR CHARGING TRACTION BATTERY

(71) Applicant: FORD GLOBAL TECHNOLOGIES, LLC, Dearborn, MI (US)

(72) Inventors: Kun Zhuge, Nanjing (CN); Baoming Ge, Okemos, MI (US); Lihua Chen, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/164,067

(22) Filed: Feb. 3, 2023

(51) Int. Cl.
| B60L 53/24 | (2019.01) |
| H02P 27/06 | (2006.01) |
| H02M 7/537 | (2006.01) |
| B60L 50/60 | (2019.01) |
| H02M 1/44 | (2007.01) |

(52) U.S. Cl.
CPC .............. *H02P 27/06* (2013.01); *B60L 50/60* (2019.02); *B60L 53/24* (2019.02); *H02M 1/44* (2013.01); *H02M 7/537* (2013.01)

(58) Field of Classification Search
CPC ....................................................... H02P 27/06
See application file for complete search history.

(56) References Cited

U.S. PATENT DOCUMENTS

| 10,189,357 B2 * | 1/2019 | Zou ........................ H02M 1/08 |
| 2017/0259672 A1 * | 9/2017 | Lei ......................... B60L 50/61 |
| 2018/0037121 A1 * | 2/2018 | Narla ........................ H02J 7/35 |
| 2022/0297557 A1 * | 9/2022 | Prasad ................ H02M 3/1586 |
| 2022/0402390 A1 * | 12/2022 | Smolenaers ............ H02J 3/322 |
| 2023/0261469 A1 * | 8/2023 | Atluri ................... H02J 7/0047 |
| | | 307/23 |

FOREIGN PATENT DOCUMENTS

| EP | 3183795 B1 | 2/2016 |
| JP | 4285458 B2 | 6/2009 |

OTHER PUBLICATIONS

Introduction to Three Level Inverter (TLI) Technology; Powerex, First Release Jun. 1, 2009, 3 pages.

* cited by examiner

*Primary Examiner* — Jared Fureman
*Assistant Examiner* — Esayas G Yeshaw
(74) *Attorney, Agent, or Firm* — David B. Kelley; Brooks Kushman P.C.

(57) ABSTRACT

An inverter is electrically connected between a traction battery and a switch bank. The inverter includes a plurality of pairs of series connected power semiconductor devices. Each of the pairs is electrically connected in parallel with the traction battery to define a phase leg, and each of the power semiconductor devices has a body diode in parallel therewith. The inverter also includes a plurality of diodes connected in parallel with the power semiconductor devices such that only one of the power semiconductor devices of each of the pairs has one of the diodes connected in parallel therewith.

20 Claims, 3 Drawing Sheets

MOTOR INVERTER BASED CONVERTER FOR CHARGING TRACTION BATTERY

TECHNICAL FIELD

This disclosure relates to automotive power systems.

BACKGROUND

An electrified vehicle may include a traction battery and an electric machine. Electric power from the traction battery may be supplied to the electric machine. The electric machine may convert the electric power to mechanical power to propel the vehicle.

The traction battery may be charged with electric power from a charge station. Depending on the charge station, it may output alternating current or direct current. A cord set is sometimes used to connect the charge station and vehicle via a plug.

SUMMARY

A vehicle includes a traction battery, DC charge terminals, a switch bank having a plurality of switches electrically connected between the traction battery and DC charge terminals, an inverter, and an electric machine electrically connected with the inverter. The inverter is electrically connected between the traction battery and switch bank, and includes (i) a plurality of pairs of series connected power semiconductor devices, each of the pairs being electrically connected in parallel with the traction battery to define a phase leg, and each of the power semiconductor devices having a body diode in parallel therewith, and (ii) a plurality of diodes connected in parallel with the power semiconductor devices such that only one of the power semiconductor devices of each of the pairs has one of the diodes connected in parallel therewith, An automotive power system includes an inverter, a filter including a plurality of inductors, and a switch bank including a plurality of switches electrically connected between the inverter and filter such that each of the switches is electrically connected between the inverter and only one of the inductors in series. The inverter includes (i) a plurality of parallel pairs of series connected power semiconductor devices, each of the pairs defining a phase leg, and each of the power semiconductor devices having a body diode in parallel therewith, and (ii) a plurality of diodes connected in parallel with the power semiconductor devices such that only one of the power semiconductor devices of each of the pairs has one of the diodes connected in parallel. The automotive power system further includes an electric machine having a plurality of windings. A terminal of each of the windings is electrically connected with adjacent terminals of the power semiconductor devices of only one of the pairs.

An automotive control system has an inverter, a filter including a plurality of inductors, and a switch bank including a plurality of switches electrically connected between the inverter and filter such that each of the switches is electrically connected between the inverter and only one of the inductors in series. The inverter includes (i) a plurality of parallel pairs of series connected power semiconductor devices, each of the pairs defining a phase leg, and each of the power semiconductor devices having a body diode in parallel therewith, (ii) a plurality of diodes connected in parallel with the power semiconductor devices such that only one of the power semiconductor devices of each of the pairs has one of the diodes connected in parallel therewith, and (iii) a plurality of current sensors each configured to measure a current flow associated with one of the phase legs. The automotive control system further has a controller that receives data from the current sensors and generates commands for the switches based on the data.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In order to be compatible with 400V DC charging stations, 800V-class battery electric vehicles may need an interface converter between the 400V DC charging station and 800V battery. Some vehicles are equipped with an optional 150 kW DC/DC booster to achieve this purpose. This may have some drawbacks. Other vehicles may borrow their electric drive system to set up a booster, which uses the motor windings as inductor coils and the inverter as a boost converter. This may generate unintentional torque when current flows through motor windings. Also, such arrangements may require that the motor windings' neutral point be connected to the charger station when using booster charging. This may introduce design complexity.

Figure 1:
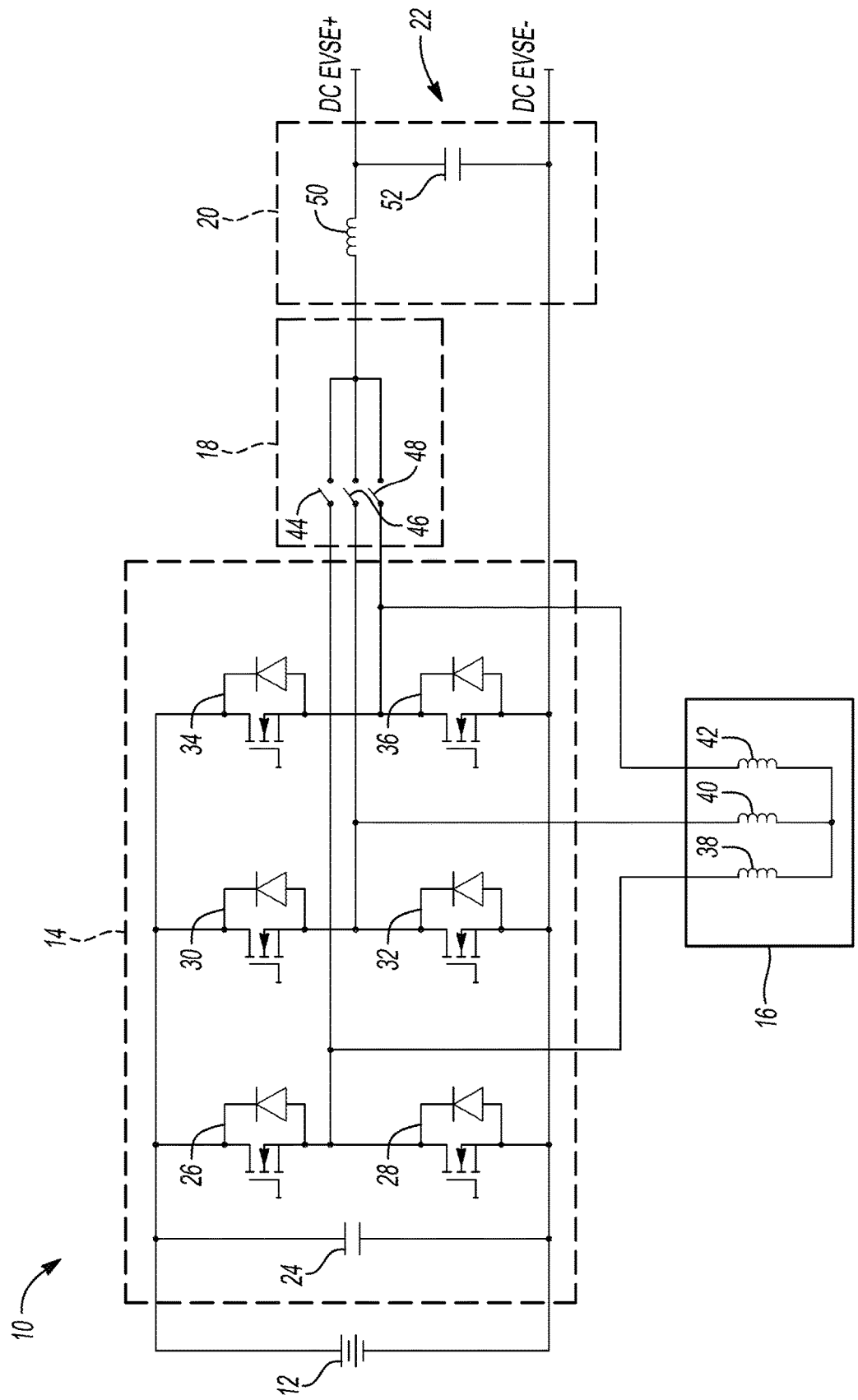
FIG. 1 is a schematic diagram of an automotive power system.

Referring to FIG. 1, an automotive power system 10 with reduced complexity includes a traction battery 12, an inverter 14, an electric machine 16, a switch bank 18, a filter 20, and DC input terminals 22. The inverter 14 includes a link capacitor 24, and switch/diode arrangements 26, 28, 30, 32, 34, 36. The electric machine 16 includes U, V, and W windings 38, 40, 42, respectively. The switch bank 18 includes switches 44, 46, 48. The filter 20 includes an inductor 50 and capacitor 52.

The link capacitor 24 is in parallel with the traction battery 12. The switch/diode arrangements 26-36 are arranged in pairs to define phase legs: the switch/diode arrangements 26, 28 define a first phase leg, the switch/diode arrangements 30, 32 define a second phase leg, etc. The switch/diode arrangements 26, 28 share a terminal with the U winding 38 and switch 44. The switch/diode arrangements 30, 32 share a terminal with the V winding 40 and switch 46. The switch/diode arrangements 34, 36 share a terminal with the W winding 42 and switch 48. The U, V, W windings 38, 40, 42 share a common terminal. The switches 44, 46, 48 also share a terminal with the inductor 50. The inductor 50 shares a terminal with the capacitor 52. The capacitor 52 shares terminals with the DC input terminals 22.

With this topology, the U, V, W windings 38, 40, 42 can be shorted in a boost mode to eliminate unintentional motor torque and limit motor heating because no current flows in the U, V, W windings 38, 40, 42 during boost charging. Loop currents may occur if the switch/diode arrangements 28, 32, 36 are not turned on/off simultaneously.

Figure 2:
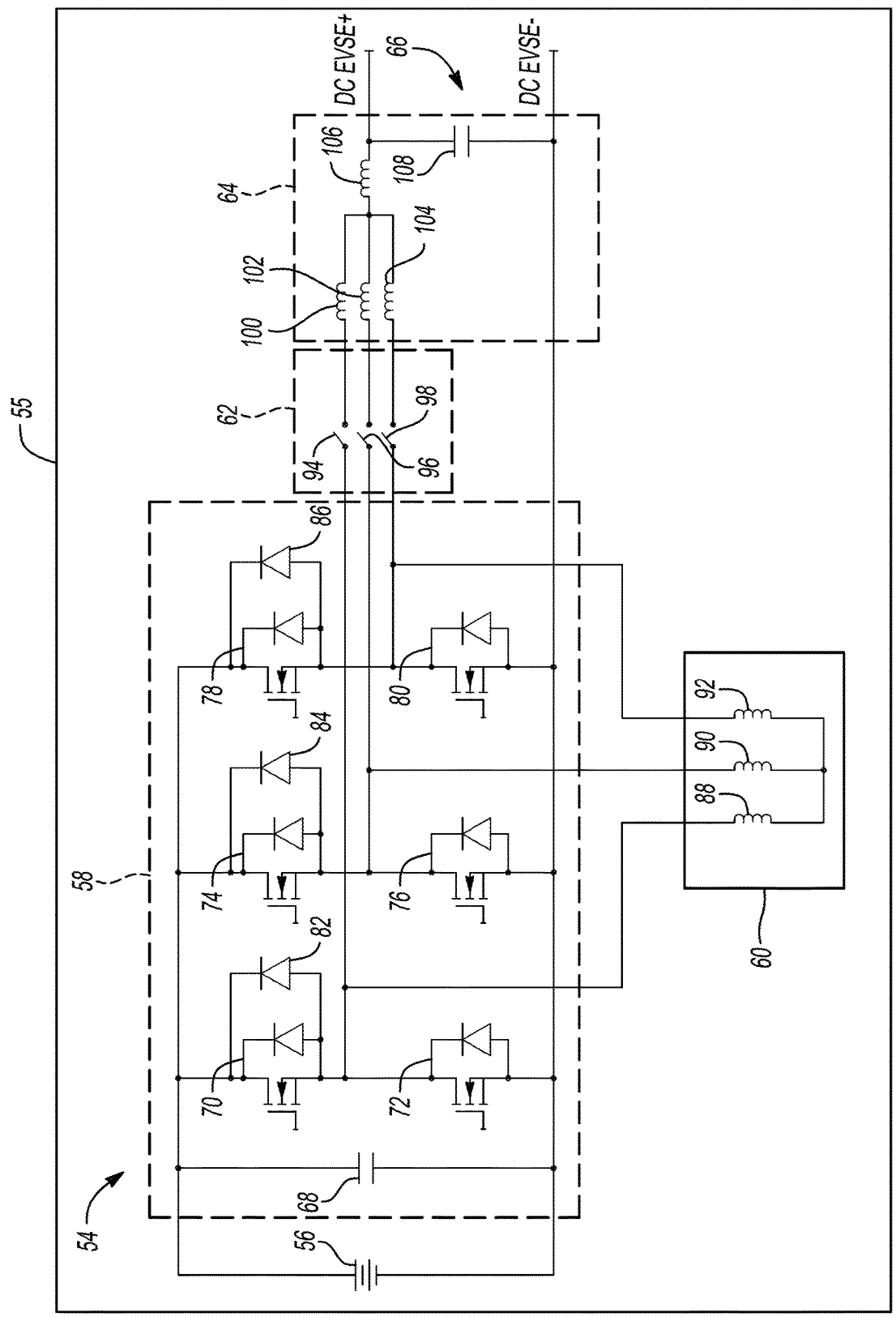
FIG. 2 is a schematic diagram of another automotive power system.

Referring to FIG. 2, an automotive power system 54 of a vehicle 55 includes a traction battery 56, an inverter 58, an electric machine 60, a switch bank 62, a filter 64, and DC input terminals 66. The inverter 58 includes a link capacitor 68, switch/diode arrangements (a power semiconductor device with a body diode in parallel with the power semiconductor device) 70, 72, 74, 76, 78, 80, and diodes 82, 84, 86. The electric machine 60 includes U, V, and W windings 88, 90, 92, respectively. The switch bank 62 includes switches 94, 96, 98. The filter 64 includes an inductors 100, 102, 104, 106 and capacitor 108.

The link capacitor 68 is in parallel with the traction battery 56. The switch/diode arrangements 70-80 are arranged in pairs to define phase legs: the switch/diode arrangements 70, 72 define a first phase leg, the switch/diode arrangements 74, 76 define a second phase leg, etc. Adjacent terminals of the switch/diode arrangements 70, 72 share a connection with a terminal of the U winding 88 and a terminal of the switch 94 to define a node. Adjacent terminals of the switch/diode arrangements 74, 76 share a connection with a terminal of the V winding 90 and a terminal of the switch 96 to define a node. Adjacent terminals of the switch/diode arrangements 78, 80 share a connection with a terminal of the W winding 92 and a terminal of the switch 98 to define a node. The switch/diode arrangements 70, 74, 78 are also respectively in parallel with the diodes 82, 84, 86.

The U, V, W windings 88, 90, 92 share a common terminal. The switch 94 and inductor 100 are in series. The switch 96 and inductor 102 are in series. The switch 98 and inductor 104 are in parallel. The inductors 100, 102, 104 share a terminal with the inductor 106. The inductor 106 shares a terminal with the capacitor 108. The capacitor 108 shares terminals with the DC input terminals 66.

Besides the inductor 106, the smaller inductors 100, 102, 104 are designed respectively in between the switches 94, 96, 98 and the inductor 106. The smaller inductors 100, 102, 104 prevent loop currents. For example, assuming the switch/diode arrangement 80 is the first to turn on, the switch/diode arrangements 72, 76 will then turn on right after with a time interval $t_{on\_interval}$. If there are no smaller inductors, the whole amount of current from the inductor 106 will flow to the switch/diode arrangement 80 directly. Given presence of the smaller inductors 100, 102, 104, the whole amount of current from the inductor 106 will be shared by the three smaller inductors 100, 102, 104. At the moment of turning on the switch/diode arrangement 80, the current that flows to the switch/diode arrangement 80 is equal to the current in the smaller inductor 104, which is roughly ⅓ of the current in the inductor 106. Due to equation $U_{104}=L_{104}*di/dt$, current in the switch/diode arrangement 80 will not change suddenly. Within $t_{on\_interval}$, there will be current rise in the smaller inductor 104 and switch/diode arrangement 80. The current will be self-balanced once the switches 72, 76, 80 are all turned on. Therefore, the smaller inductors 100, 102, 104 help mitigate semiconductor switch over current and/or system loop current issues due to asynchronous turning-on of the switch/diode arrangements 72, 76, 80.

The diodes 82, 84, 86 are designed in parallel to the switch/diode arrangements 70, 74, 78, respectively. In 800V-class battery electric vehicles, such power semiconductor switches are typically silicon carbide based due to its superior performance in high voltage applications. The current capability of the associated body diodes of the switch/diode arrangements is limited. When the inverter 58 is operated in boost mode for DC charging, the current will continuously go through the body diodes. By adding the parallel diodes 82, 84, 86 to the upper switch/diode arrangements 70, 74, 78 (and not the lower switch/diode arrangements 72, 76, 80), the current will be shared among the body diodes and the parallel diodes 82, 84, 86, which can help to mitigate body diode overload. The body diodes and parallel diodes 82, 84, 86 are arranged such that corresponding body diodes and parallel diodes 82, 84, 86 have respective anodes connected together and respective cathodes connected together.

Figure 3:
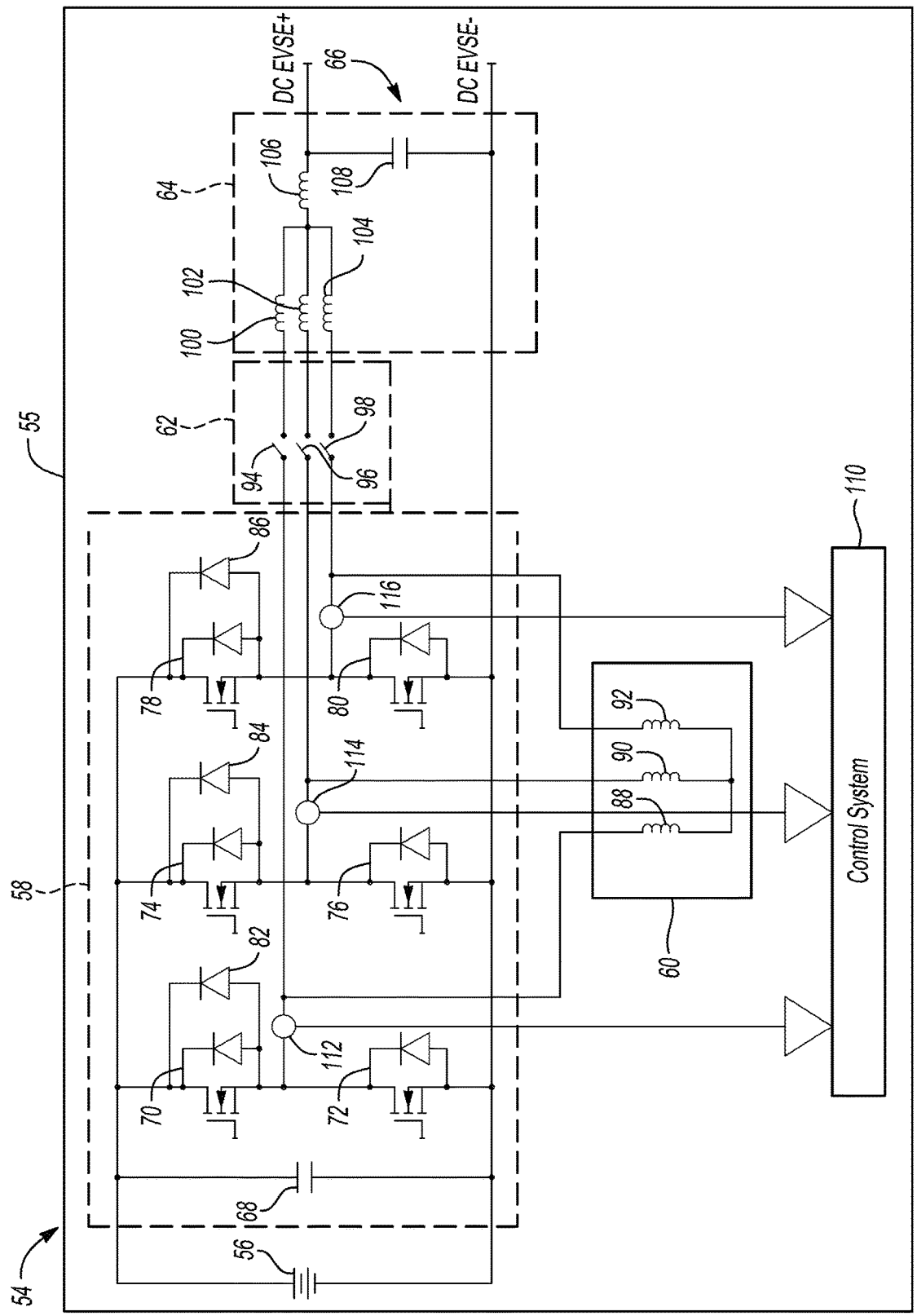
FIG. 3 is a schematic diagram of the automotive power system of FIG. 2 with current sensors and a control system.

Referring to FIG. 3, the automotive power system 54 further includes a control system 110 (e.g., controller, etc.), and the inverter 58 further includes current sensors 112, 114, 116. The control system 110 is in communication with/exerts control over (e.g., generates commands for) the traction battery 56, inverter 58, switch bank 62, and DC input terminals 66. The current sensor 112 measures current flow through the switch 94 and associated with the corresponding phase leg. The current sensor 114 measures current flow through the switch 96 and associated with the corresponding phase leg. The current sensor 116 measures current flow through the switch 98 and associated with the corresponding phase leg. The control system 110 generates commands to open and close the switches 94, 96, 98 based on data from the current sensors 112, 114, 116.

The current flowing through the inductor 106 is the sum of the values from the current sensors 112, 114, 116. The current sensor feedback signals also indicate current balancing status among the three phase legs: the switch of the switch/diode arrangement 72, the body diode of the switch/diode arrangement 70, and the diode 82 being associated with the first phase leg, the switch of the switch/diode arrangement 76, the body diode of the switch/diode arrangement 74, and the diode 84 being associated with the second phase leg, and the switch of the switch/diode arrangement 80, the body diode of the switch/diode arrangement 78, and the diode 86 being associated with the third phase leg. This design will facilitate real-time circuit protection against current unbalancing issues.

The proposed topology proposes an arrangement that permits 800V traction batteries to be charged with 400V public charging stations, and includes integrated half-bridges with an additional boost inductor to achieve onboard DC charging. Relative to an independent onboard DC fast charger, this may reduce the number of semiconductor switch components needed. The additional boost inductor design does not require use of the electric machine 60, which reduces electric machine heating because there is no current flowing through the electric machine windings.

The switches 94, 96, 98 will permit operation in two different modes: 1) inverter mode if the switches 94, 96, 98 are open and 2) DC boost mode if the switches 94, 96, 98 are closed. When the switches 94, 96, 98 are closed, the U, V, W, windings 88, 90, 92 will short to prevent unintentional torque ripples.

The smaller inductors 100, 102, 104 may affect the DC boost mode circuit capability by mitigating potential loop current due to asynchronous turning-on of the switch/diode arrangements 72, 76, 80. The parallel diodes 82, 84, 86 will share the boost current to mitigate body diode overload. Booster operating frequency can be increased due to use of silicon-carbide metal oxide semiconductor field effect transistors. Faster switching may be able to minimize inductor and capacitor sizing.

Without additional current sensors, the contemplated DC/DC booster circuits realize current loop control by borrowing the current sensors from the motor inverter. Because each phase leg has a current sensor, it may help to prevent current unbalancing from occurring in certain situations.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of these disclosed materials. The terms "controller" and "controllers," for example, can be used interchangeably herein.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a traction battery;
   DC charge terminals;
   a switch bank having a plurality of switches electrically connected between the traction battery and DC charge terminals;
   an inverter, electrically connected between the traction battery and switch bank, including (i) a plurality of pairs of series connected power semiconductor devices, each of the pairs being electrically connected in parallel with the traction battery to define a phase leg, and each of the power semiconductor devices having a body diode in parallel therewith, and (ii) a plurality of diodes connected in parallel with the power semiconductor devices such that only one of the power semiconductor devices of each of the pairs has one of the diodes connected in parallel therewith; and
   an electric machine electrically connected with the inverter.

2. The vehicle of claim 1, wherein each of the switches is electrically connected between one of the phase legs and the DC charge terminals.

3. The vehicle of claim 1, wherein a terminal of each of the switches shares a node with terminals of the power semiconductor devices of only one of the pairs.

4. The vehicle of claim 1, wherein the electric machine includes a plurality of windings and wherein a terminal of each of the windings is electrically connected with adjacent terminals of the power semiconductor devices of only one of the pairs.

5. The vehicle of claim 4, wherein another terminal of each of the windings is shared.

6. The vehicle of claim 1 further comprising a filter including a plurality of inductors electrically connected between the DC charge terminals and switch bank such that each of the inductors is electrically connected in series with only one of the switches.

7. The vehicle of claim 6, wherein the filter further includes another inductor sharing a terminal with the inductors such that the inductors are electrically connected between the switch bank and the another inductor.

8. The vehicle of claim 1, wherein a number of the diodes is half a number of the power semiconductor devices.

9. The vehicle of claim 1, wherein the inverter includes a plurality of current sensors each configured to measure a current flow through one of the switches.

10. The vehicle of claim 9 further comprising a controller configured to receive data from the current sensors and to generate commands for the switches based on the data.

11. An automotive power system comprising:
    an inverter including (i) a plurality of parallel pairs of series connected power semiconductor devices, each of the pairs defining a phase leg, and each of the power semiconductor devices having a body diode in parallel therewith, and (ii) a plurality of diodes connected in parallel with the power semiconductor devices such that only one of the power semiconductor devices of each of the pairs has one of the diodes connected in parallel therewith;
    a filter including a plurality of inductors;
    a switch bank including a plurality of switches electrically connected between the inverter and filter such that each of the switches is electrically connected between the inverter and only one of the inductors in series; and
    an electric machine including a plurality of windings, a terminal of each of the windings being electrically connected with adjacent terminals of the power semiconductor devices of only one of the pairs.

12. The automotive power system of claim 11, wherein a terminal of each of the switches shares a node with terminals of the power semiconductor devices of only one of the pairs.

13. The automotive power system of claim 11, wherein another terminal of each of the windings is shared.

14. The automotive power system of claim 11, wherein the filter further includes another inductor sharing a terminal with the inductors such that the inductors are electrically connected between the switch bank and the another inductor.

15. The automotive power system of claim of claim 11, wherein a number of the diodes is half a number of the power semiconductor devices.

16. The automotive power system of claim 11, wherein the inverter includes a plurality of current sensors each configured to measure a current flow through one of the switches.

17. The automotive power system of claim 16 further comprising a controller configured to receive data from the current sensors and to generate commands for the switches based on the data.

18. An automotive control system comprising:
an inverter including (i) a plurality of parallel pairs of series connected power semiconductor devices, each of the pairs defining a phase leg, and each of the power semiconductor devices having a body diode in parallel therewith, (ii) a plurality of diodes connected in parallel with the power semiconductor devices such that only one of the power semiconductor devices of each of the pairs has one of the diodes connected in parallel therewith, and (iii) a plurality of current sensors each configured to measure a current flow associated with one of the phase legs;
a filter including a plurality of inductors;
a switch bank including a plurality of switches electrically connected between the inverter and filter such that each of the switches is electrically connected between the inverter and only one of the inductors in series; and
a controller configured to receive data from the current sensors and to generate commands for the switches based on the data.

19. The automotive control system of claim 18 further comprising an electric machine including a plurality of windings, a terminal of each of the windings being electrically connected with adjacent terminals of the power semiconductor devices of only one of the pairs.

20. The automotive control system of claim 18, wherein a terminal of each of the switches shares a node with terminals of the power semiconductor devices of only one of the pairs.

* * * * *